Figure 1:
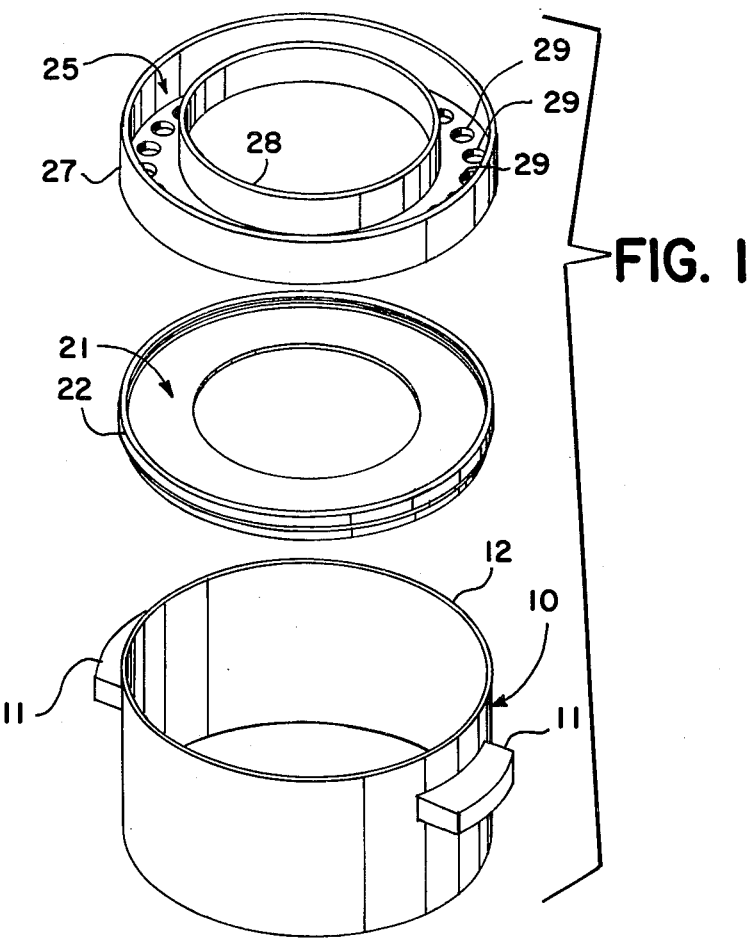

United States Patent [19]

Schwind et al.

[11] 4,157,707

[45] Jun. 12, 1979

[54] OVERFLOW PREVENTING KITCHEN UTENSIL

[76] Inventors: Heinz F. Schwind, 7703 Hartel St., Philadelphia, Pa. 19152; Annemarie Titz, Hünefeld 6, 8000 München 50, Fed. Rep. of Germany; Leopold Koestel, 2729 Line Lexington Rd., Hatfield, Pa. 19440

[21] Appl. No.: 792,190

[22] Filed: Apr. 29, 1977

[51] Int. Cl.² ............................................. A47J 27/58
[52] U.S. Cl. .................................. 126/386; 220/4 C; 220/374
[58] Field of Search ................... 126/385, 386, 377; 220/4 A, 4 C, 428, 373, 374; 99/400, 408

[56] References Cited

U.S. PATENT DOCUMENTS 2,814,409  11/1957  Perez ................................. 220/4 C
3,744,671  7/1973  Saunders, Jr. ..................... 220/4 A

FOREIGN PATENT DOCUMENTS 487807  6/1938  United Kingdom ................... 126/386

Primary Examiner—John J. Camby
Assistant Examiner—Larry I. Schwartz
Attorney, Agent, or Firm—Weiser, Stapler & Spivak

[57] ABSTRACT

A utensil adapted to be positioned upon the rim of a cooking vessel has two annular channels, one open toward the center, the other open toward the top. The upper wall of the first channel defines the bottom of the second channel. A plurality of apertures in the bottom of the second channel communicate with the first channel, these apertures being closer to the outer than to the inner wall of the second channel.

6 Claims, 2 Drawing Figures

OVERFLOW PREVENTING KITCHEN UTENSIL

This invention relates to kitchen utensils, and particularly to devices which cooperate with otherwise conventional pots and pans so as to improve the ability of such cooking vessels to process substances which tend to develop rising surface positions while being processed.

It is notorious that many cooking processes develop, in the substance being subjected to the process, a tendency to form bubble or foam layers at the surface. These layers often form quite suddenly, and increase rapidly in height. Unless checked, they quickly rise above the rim of any pot or pan of practical dimensions, and overflow that rim. This has seriously undesirable consequences. One such consequence is that the outside of the cooking vessel becomes coated with the overflowing substance, which complicates the subsequent cleaning of the vessel, creates a messy appearance while the cooking progresses, and may create noxious odors. Another undesirable consequence is that this same overflowing substance may actually spill onto the cooking surface (stove top, burner, etc.) where it produces similar undesirable effects as on the cooking vessel itself. Still another undesirable effect is that this overflow represents a loss of contents from the vessel which can, in some cases, appreciably reduce the final quantity of the food being prepared. Last, but not least, the overflowing portion often contains predominantly certain ingredients of the substance which is being cooked. Therefore, this overflow alters the proportions of ingredients remaining in the vessel, and as a result, it also changes the characteristics of the product ultimately obtained by the cooking process.

Heretofore, the technique of choice for dealing with this overflow problem has involved careful control of the application of heat to the cooking vessel. Through experience with particular substances, specific sizes and configuration of pots and pans, and specific stoves and burners, the cook gradually developed the skill to initially set and subsequently vary the heating conditions in such a manner as to reduce the overflow problem.

However, this technique constitutes a far-from satisfactory solution to the problem. As a minimum, it requires considerable experience. The results of this experience become unreliable when conditions change, e.g. when an unfamiliar burner, or a different size pot has to be used, or when some change is made in the ingredients being processed. In practice, continual vigilant observation of the cooking process, and rapid control reaction is needed. Moreover, there are instances in which the application of heat must be restricted below what would be best from the standpoint of cooking speed, merely to avoid the overflow phenomenon—with all its undesirable side effects.

Although the present inventors are not familiar with the details, it is their general understanding that attempts have been made by others to modify the structure of the cooking vessels, themselves, to deal with this problem. Apparently such attempts have not been successful. This is most clearly evidenced by the fact that the pots and pans on the market are of essentially conventional construction, and appear to have no special provisions for dealing with the overflow problem, which remains as troublesome as ever.

Accordingly, it is a principal object of the invention to provide a technique for reducing the problem of overflow in cooking vessels.

It is another object to provide a device which cooperates with conventional pots or pans to reduce their overflow problem.

It is another object to provide such a device which is simple to use and convenient to clean.

It is another object to provide such a device which reduces the need for the cook to regulate the heating process.

It is another object to provide such a device which does not adversely affect the other characteristics of the cooking vessel.

These and other objects which will appear are achieved in accordance with the invention by an annular element adapted to be positioned upon the upper rim of the cooking vessel. The element has two annular channels, a lower channel open toward the center and extending horizontally outward toward the outer rim, and an upper channel open upwardly and extending vertically downward. Apertures are provided for communicating between the two channels. A substance rising within the cooking vessel is guided initially by the lower wall of the lower channel. It then flows upwardly along the inner wall of the upper channel, and over its edge into that channel. Finally, through the apertures between channels, it flows downwardly into the lower channel, and out of its inward opening back into the cooking vessel.

Figure 2:
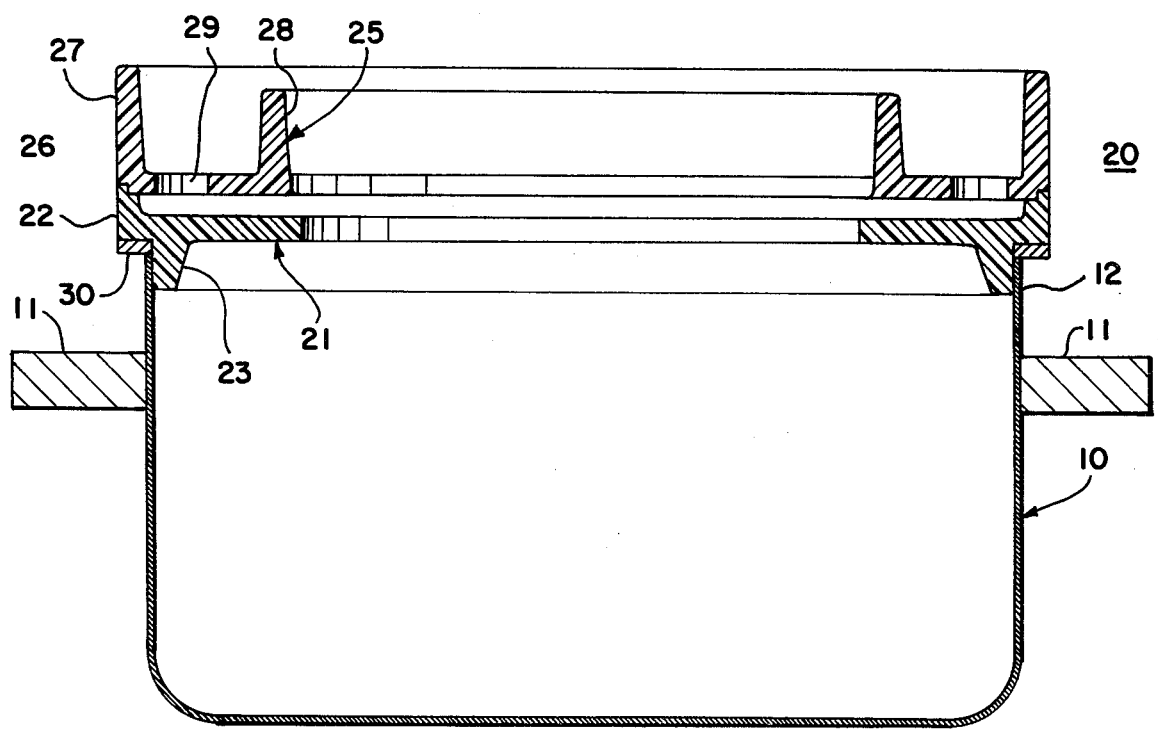

For further details, reference is made to the discussion which follows, in light of the accompanying drawings wherein:

FIG. 1 is an exploded view of an embodiment of the invention and a typical cooking pot with which it is designed to cooperate; and FIG. 2 is a cross-sectional view (not to the same scale) showing the elements of FIG. 1 in their cooperating positions.

The same reference numerals designate corresponding elements in the two figures.

Referring now to these drawings, they show a conventional cooking pot 10 having handles 11 extending from its sidewalls. Adapted to be positioned in engagement with the upper rim 12 of pot 10 is an assembly 20. The assembly 20 has three annular components.

One component is a shelf-like member 21 which extends horizontally from just beyond the rim 12 of cooking pot 10 toward the interior of the pot. Shelf-like member 21 has an upturned rim 22 at its outer end, and a downturned flange 23 spaced a short distance inwardly toward the center of the annular shelf-like member 21. The flange 23 is so positioned radially that it engages the inside of the sidewall of pot 10 when the member 21 is placed concentrically upon the upper rim 12 of the pot.

The second component of assembly 20 is an annular trough-, or channel-shaped member 25. This member 25 is so dimensioned that its outer edge rests upon the upturned rim 22 of shelf-like member 21. For concentric annular alignment of members 21 and 25, there is preferably provided a step-shaped interlocking configuration best visible at 26 in FIG. 2. The outer rim 27 of channel member 25 is preferably higher than its inner rim 28. The overall width of channel member 25 is such that the inner edge of shelf-like member 21 protrudes radially inward farther than channel member 25.

In the bottom of channel member 25 there are a plurality of apertures 29, also positioned annularly around the channel member, and communicating with the space between channel member 25 and shelf-like member 21. As is best visible in FIG. 2, those apertures 29 are preferably positioned substantially closer to the outer wall 27 than to the inner wall 28 of channel member 25.

Finally, below the outer horizontal edge of shelf member 21, there is a gasket 30, which rests upon pot rim 12, and upon which rests in turn the remainder of assembly 20.

In operation, as previously indicated, the substances being processed within cooking pot 10 may develop bubbles and/or foam on their top surface. Particularly when heat is being rapidly supplied, this foam may rise quite rapidly within pot 10, and quickly reach and extend beyond its upper rim 12.

In the presence of assembly 20, this foam will thereafter not simply overflow the rim of the pot. Rather it will be directed first generally horizontally inwardly along the lower face of shelf-like member 21. As the foam continues to rise, it will turn the corner at the innermost edge of member 21 and will continue upwardly within the circular opening in the middle of assembly 20. In the process it will be horizontally constrained by that surface of inner wall 28 which is closest to the center of the assembly. Eventually, if the foam continues to rise, it will overflow that inner wall 28 and be received within the channel defined by it and by outer wall 29 of channel-shaped member 25.

While the inventors do not wish to be bound by this explanation, it is their belief that contact with the above-described surfaces of assembly 20 has the effect of cooling the foam, before and as it overflows into channel member 25. This causes the foam to condense into liquid. This liquid then flows through apertures 29 into the radial channel defined above shelf-like member 21, and from there back into the pot. In this way, there is set up a sort of liquid return cycle, which, in practice, substantially precludes the possibility of foam overflowing the outer wall 27.

Regardless of the theoretical explanation, observation has shown that, with the use of an assembly 20 embodying the invention, the incidence of overflows is drastically reduced. Moreover, this reduction takes place for a wide variety of substances being processed, and even under conditions of continuing rapid heating. Such an assembly 20 has been successfully used in preventing overflow in the cooking of, for example, vegetables, soups, noodle products, rice, grain products, meats, meat fondues, and in deep fat frying.

It has also been observed that the placement of apertures 29 closer to the outer wall 27 than the inner wall 28 of channel-shaped member 25 is advantageous. Presumably there are two reasons for this. First, it lengthens the path of the substances being returned to the cooking vessel, thereby contributing to their cooling and return to liquid state. Secondly, some foam may enter the lower channel defined above shelf-like member 21, for the interior of the vessel. This foam does not reach apertures 29 readily and therefore does not plug them up for passage of overflow returning downwardly through them. Again, irrespective of the soundness of this theoretical explanation, the beneficial effects of this aperture placement have been confirmed by observation.

The assembly 20 may be made of a variety of suitable materials, which are easy to clean, resistant to heat, and non-contaminating to food. For example, polypropylene is such a material. The gasket 30 may be made of a suitable resiliant material, such as rubber.

There is considerable latitude of design with respect to specific shapes and dimension.

The width of the upper channel defined in member 25 is preferably about one inch, and its depth is preferably approximately equal to its width. The apertures 29 are preferably about one-half inch in diameter, and are spaced about one-half inch apart along the circumference. The vertical distance between shelf-like member 21 and the bottom of channel-shaped member 25 is preferably about one quarter inch. However, we have found that these dimensions are not highly critical and that they can be varied within reasonably wide limits while still preserving the effectiveness of the device.

The shape of apertures 20 may also be varied. For example, they may be made oval or slot-shaped.

Assembly 20 has been described and shown as being constructed of several separate components. This is preferred because it makes it particularly convenient to clean since it can be disassembled for cleaning. However, in principle, the assembly can also be provided all in one piece.

For different sizes of pots there can be provided assemblies of different diameters, particularly with respect to the positioning of flange 23. Alternatively, the same channel-shaped member 25 can be used, and only different shelf-like members 21 substituted, each with a flange 23 positioned to engage a different pot rim diameter. As still another alternative, a single shelf-like member 21 can be equipped with a series of concentric flanges 23, positioned so that they respectively engage the rims of pots of different diameters.

It will be noted that this assembly can be made to fit virtually any size of pot or pan, from small ones used in the house to large kettles used in restaurants or institutions.

We claim:

1. A cooking utensil adapted to be positioned upon the rim of a cooking vessel, comprising:
    a first annular channel open toward the center and defined by upper and lower walls;
    a second annular channel open toward the top and defined by inner and outer walls connected by bottom, the upper wall of the first channel defining the bottom of the second channel and the lower wall of the first channel being defined by an annular shelf-like member detached from the second channel; and
    a plurality of apertures in the bottom of the second channel communicating with the first channel, said apertures being positioned closer to the outer wall of the second channel than to its inner wall.

2. The utensil of claim 1 wherein
    the shelf-like member has an upturned annular edge at its outer periphery, said edge being configured to mate with and support the second channel.

3. The utensil of claim 2 wherein
    the second channel is made of an annular channel-shaped member.

4. The utensil of claim 1 wherein
    the lower wall of the first channel extends further toward the center than its upper wall.

5. The utensil of claim 1 wherein
    the inner wall of the second channel is lower than its outer wall.

6. The utensil of claim 1 wherein
    the utensil has a downwardly extending annular flange for engaging the rim of the vessel.

* * * * *